(12) United States Patent
Hess et al.

(10) Patent No.: US 7,353,392 B2
(45) Date of Patent: Apr. 1, 2008

(54) METHOD AND CONFIGURATION FOR MUTUAL AUTHENTICATION OF TWO DATA PROCESSING UNITS

(75) Inventors: Erwin Hess, Ottobrunn (DE); Wolfgang Pockrandt, Reichertshausen (DE)

(73) Assignee: Infineon Technologies AG, Munich (DE)

( * ) Notice: Subject to any disclaimer, the term of this patent is extended or adjusted under 35 U.S.C. 154(b) by 964 days.

(21) Appl. No.: 10/215,131

(22) Filed: Aug. 8, 2002

(65) Prior Publication Data

US 2003/0018893 A1 Jan. 23, 2003

Related U.S. Application Data

(63) Continuation of application No. PCT/DE01/00335, filed on Jan. 26, 2001.

(30) Foreign Application Priority Data

Feb. 8, 2000 (EP) ................................. 00102634

(51) Int. Cl.
*H04L 9/34* (2006.01)
*H04L 9/24* (2006.01)
*H04L 9/28* (2006.01)

(52) U.S. Cl. ...................... 713/169; 713/168; 713/161; 380/271

(58) Field of Classification Search ................ 713/168, 713/169
See application file for complete search history.

(56) References Cited

U.S. PATENT DOCUMENTS

| | | | |
|---|---|---|---|
| 5,225,664 A | | 7/1993 | Iijima |
| 5,317,637 A | * | 5/1994 | Pichlmaier et al. ........... 705/67 |
| 5,729,608 A | * | 3/1998 | Janson et al. ................ 713/171 |
| 5,799,085 A | * | 8/1998 | Shona ......................... 713/169 |
| 6,049,611 A | * | 4/2000 | Tatebayashi et al. .......... 380/44 |
| 6,510,517 B1 | * | 1/2003 | Bruhnke et al. ............. 713/168 |

FOREIGN PATENT DOCUMENTS

| | | |
|---|---|---|
| EP | 0 440 158 A1 | 8/1991 |
| EP | 0 782 115 A3 | 1/1998 |

(Continued)

OTHER PUBLICATIONS

Mitchell, C. "Limitations of Challenge-Response Entity Authentication." Electronic Letters vol. 25 No. 17. Aug. 17, 1989. 1195-1196.*

(Continued)

*Primary Examiner*—Gilberto Barrón, Jr.
*Assistant Examiner*—Venkat Perungavoor
(74) *Attorney, Agent, or Firm*—Laurence A. Greenberg; Werner H. Stemer; Ralph E. Locher

(57) ABSTRACT

A method and a configuration are described for mutual authentication of two data processing units. The mutual authentication of two data processing units is normally carried out in two separate authentication processes, which are carried out successively. A challenge and response method is normally used. For this purpose, a first challenge is sent from a first data processing unit to a second data processing unit, which transmits a first response back. A second response is produced by the first data processing unit, and is transmitted to the second data processing unit.

9 Claims, 2 Drawing Sheets

FOREIGN PATENT DOCUMENTS

| | | |
|---|---|---|
| GB | 2 144 564 A | 3/1985 |
| JP | 8-509564 | 10/1996 |
| JP | 09 128 507 A | 5/1997 |
| JP | 11 058 732 A | 3/1999 |
| RU | 94029322 | 6/1996 |

OTHER PUBLICATIONS

Königs, H.-P.: "Cryptographic Identification Methods for Smart Cards in the Process of Standardization", IEEE, Jun. 1991, pp. 42-48.

* cited by examiner

METHOD AND CONFIGURATION FOR MUTUAL AUTHENTICATION OF TWO DATA PROCESSING UNITS

CROSS-REFERENCE TO RELATED APPLICATION

This application is a continuation of copending International Application No. PCT/DE01/00335, filed Jan. 26, 2001, which designated the United States and was not published in English.

BACKGROUND OF THE INVENTION

Field of the Invention

The present invention relates to a method and a configuration for mutual authentication of two data processing units, using a challenge and response method.

The authentication of data processing units has gained major financial importance in conjunction with electronic data transmission, electronic signatures, smart cards, such as telephone cards, and electronic purses. The authentication of data processing units is of major importance so that only authorized users or data processing units may read or modify data.

Known methods for authentication of data processing units use challenge and response methods based on cryptographic methods, such as data encryption standard (DES), rivest shamer adelman (RSA) or so-called zero knowledge techniques from Fiat Schamir, Guillou Quisquater or Schnorr.

Challenge and response methods have the common feature that a random number (challenge) is produced and is sent to the data processing unit that is to be checked. The data processing unit that is to be checked uses this to produce a response number (response), with the aid of a suitable cryptographic method, and the response number is sent back to the checking data processing unit. The checking data processing unit uses the challenge and the-response to check the authenticity of the data processing unit that is to be checked.

For mutual authentication, the challenge and response method is carried out twice, with the roles of the checking data processing unit and of the data processing unit which is to be checked being reversed when it is carried out for the second time, so that each data processing unit checks the other.

SUMMARY OF THE INVENTION

It is accordingly an object of the invention to provide a method and a configuration for mutual authentication of two data processing units that overcome the above-mentioned disadvantages of the prior art devices and methods of this general type, which specifies a simplified method for mutual authentication of two data processing units.

With the foregoing and other objects in view there is provided, in accordance with the invention, a method for mutual authentication of a first data processing unit and of a second data processing unit. The method includes producing a first bit string in the first data processing unit, transmitting the first bit string to the second data processing unit, producing a second bit string and a third bit string from the first bit string and from first data using a first algorithm in the second data processing unit, and transmitting the second bit string to the first data processing unit. A first authentication result and a fourth bit string are produced from the first bit string, from the second bit string and from second data using a second algorithm in the first data processing unit. A fifth bit string is produced from the fourth bit string and from third data using a third algorithm in the first data processing unit. The fifth bit string is transmitted to the second data processing unit. A second authentication result is produced from the third bit string, from the fifth bit string and from fourth data using a fourth algorithm in the second data processing unit.

The advantage of the method according to the invention is that the first bit string is used for authentication of the second data processing unit by the first data processing unit and for calculation of the third and of the fourth bit sequences. This method makes it possible for the second data processing unit not to have a random number generator. The lack of the random number generator allows the second data processing unit to be configured to be considerably more compact, to be simpler, and thus to be cheaper. This is a critical factor, for example, when a reliable authentication method is intended to be used in a mass-market application, such as smart cards. The saving of a random number generator results in enormous simplification of the data processing unit, since the random number generator is subject to considerable requirements with regard to its random nature and sensitivity to external manipulations. Despite this enormous simplification, cryptographic methods which are classified as being cryptographically secure, such as DES, RSA or as zero knowledge techniques can be used, and retain their security. The method according to the invention therefore satisfies the same security standards as those ensured by the methods associated with the prior art.

One advantageous embodiment of the method according to the invention provides that the third bit string is transmitted from the second data processing unit to the first data processing unit and is used by the second algorithm in order to produce the first authentication result and/or the fourth bit string. The procedure allows a greater range of calculation methods to be used in the second algorithm, thus allowing the second algorithm to be simplified.

It is furthermore advantageous for the third bit string to be an intermediate result in the calculation of the second bit string. The procedure avoids additional complexity in the first algorithm, so that the first algorithm can be carried out more quickly.

A further advantageous embodiment of the method provides for the first bit string to be produced randomly. The production of a random first bit string improves the security of the method.

It is advantageous for the first bit string to be selected such that it differs from all the previously used first bit strings. This ensures that an attacker cannot predict either the first bit string nor the second bit string which is calculated from it. This improves the security of the method.

A configuration for carrying out the method according to the invention contains a first data processing unit and a second data processing unit. A bit string generator for producing a first bit string is disposed in the first data processing unit. A first bit string processing unit for producing a second bit string and a third bit string from the first bit string and from first data is disposed in the second data processing unit. A second bit string processing unit for producing a first authentication result and a fourth bit string from the first bit string, from the-second bit string and from second data is disposed in the first data processing unit. A third bit string processing unit for producing a fifth bit string is disposed in the first data processing unit. A fourth bit string processing unit for producing a second authentication result from the third bit string, from the fifth bit string and from fourth data is disposed in the second data processing unit.

The data processing units may in this case, by way of example, be in the form of computers, laptops, palmtops, mobile telephones, handheld computers, smart cards, electronic purses, telephone cards, medical insurance cards, and a range of other user devices that can communicate directly or indirectly with a further data processing unit.

In one advantageous embodiment of the configuration according to the invention, at least one of the data processing units is in the form of an integrated circuit. This allows a very complex, space-saving data processing unit, which can be produced reproducibly.

In a further advantageous configuration, one of the data processing units is mobile. This allows the data processing unit to be transported easily.

It is also advantageous for one of the data processing units to contain a shift register, which is fed back using at least one XOR gate. An XOR gate is a logical exclusive-OR function, which is in the form of a component that is referred to as a gate. This configuration allows a very space-saving, cryptographically secure data processing unit. The shift register in this case represents a part of the unit in which one of the four algorithms is carried out.

A further advantageous configuration provides for one data processing unit to be a smart card, and for the other data processing unit to be a smart card terminal.

Other features which are considered as characteristic for the invention are set forth in the appended claims.

Although the invention is illustrated and described herein as embodied in a method and a configuration for mutual authentication of two data processing units, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
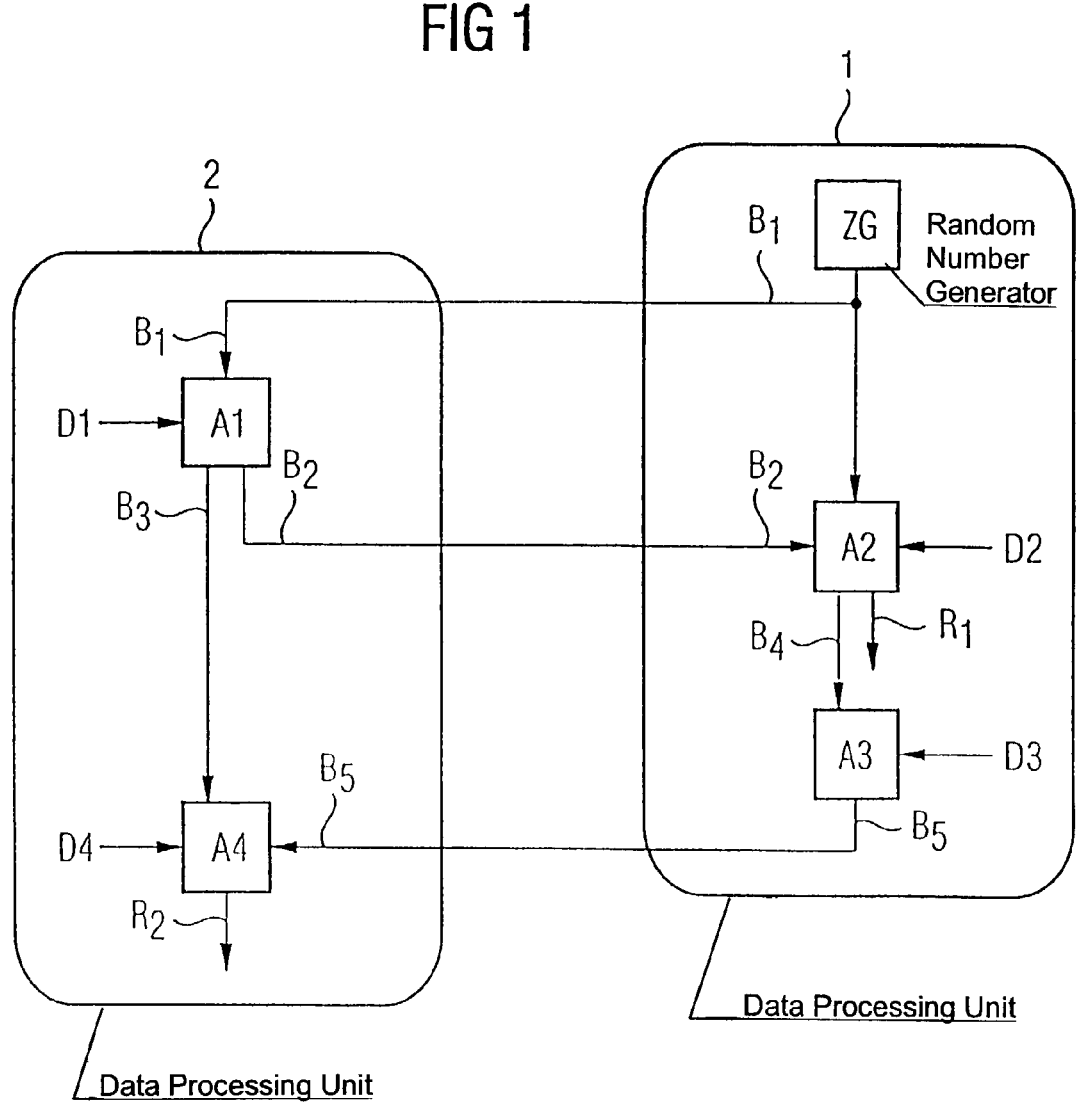
FIG. 1 is a block diagram of a first method according to the invention for mutual authentication of two data processing units.

Referring now to the figures of the drawing in detail and first, particularly, to FIG. 1 thereof, there is shown a system containing a first data processing unit 1 and a second data processing unit 2. A flowchart is described, in which some method steps are carried out in the first data processing unit 1 and other data processing steps are carried out in the data processing unit 2. The method starts with the production of a first bit string B1, which is in the exemplary embodiment produced using a random number generator ZG in the first data processing unit 1. The first bit string B1 is transmitted from the first data processing unit 1 to the second data processing unit 2, and a second bit string B2 and a third bit string B3 are produced in the second data processing unit 2, using an algorithm A1, from the first bit string B1 and from first data D1.

The algorithm may be one of the algorithms that are known from the prior art, such as DES, RSA, etc. The data D1 may be, for example, a secret key and/or other data that is required to calculate the second bit string B2 and/or the third bit string B3.

The second bit string B2 is then transmitted from the second data processing unit 2 to the first data processing unit 1. A first authentication result R1 is produced in the first data processing unit 1, as the result of the authentication process of the second data processing unit 2 by the first data processing unit 1, and a fourth bit string B4 is produced, by a second algorithm A2, from the first bit string B1, from the second bit string B2 and from second data D2. The second algorithm A2 is selected as a function of the encryption algorithm that is used (DES, RSA, etc.), and corresponds to the first algorithm A1. The data D2 contains, by way of example, a secret key or a secret master key, from which the secret key can be calculated. In the case of RSA, by way of example, it is a private and/or a public key.

A fifth bit string B5 is produced in the first data processing unit 1, by a third algorithm A3, from the fourth bit string B4 and from third data D3.

The fifth bit string B5 is transmitted from the first data processing unit 1 to the second data processing unit 2.

A second authentication result R2 is produced in the second data processing unit 2 as the result of the authentication process of the first data processing unit 1 by the second data processing unit 2, by a fourth algorithm, from the third bit string B3, from the fifth bit string B5 and from fourth data D4.

The algorithms A3 and A4 may, by way of example, be an algorithm (DES, RSA, etc.) that is known from the prior art. The data D3 and D4 are, for example, secret keys. The algorithm A1 may, for example, correspond to the algorithm A3.

If the two authentication results are positive, then the first data processing unit 1 and the second data processing unit 2 have authenticated one another. The algorithms A1, A2, A3 and A4 are, for example, cryptographic methods. The data D1, D2, D3 and D4 are, for example, secret or public keys, which are used to modify bit strings B1, B2, B3 and B4. The advantage of this method is that no random number generator is required in the second data processing unit 2. A further advantage of the method is that only three data transmissions are required between the first data processing unit 1 and the second data processing unit 2. Conventionally, four data transmissions are required.

Figure 2:
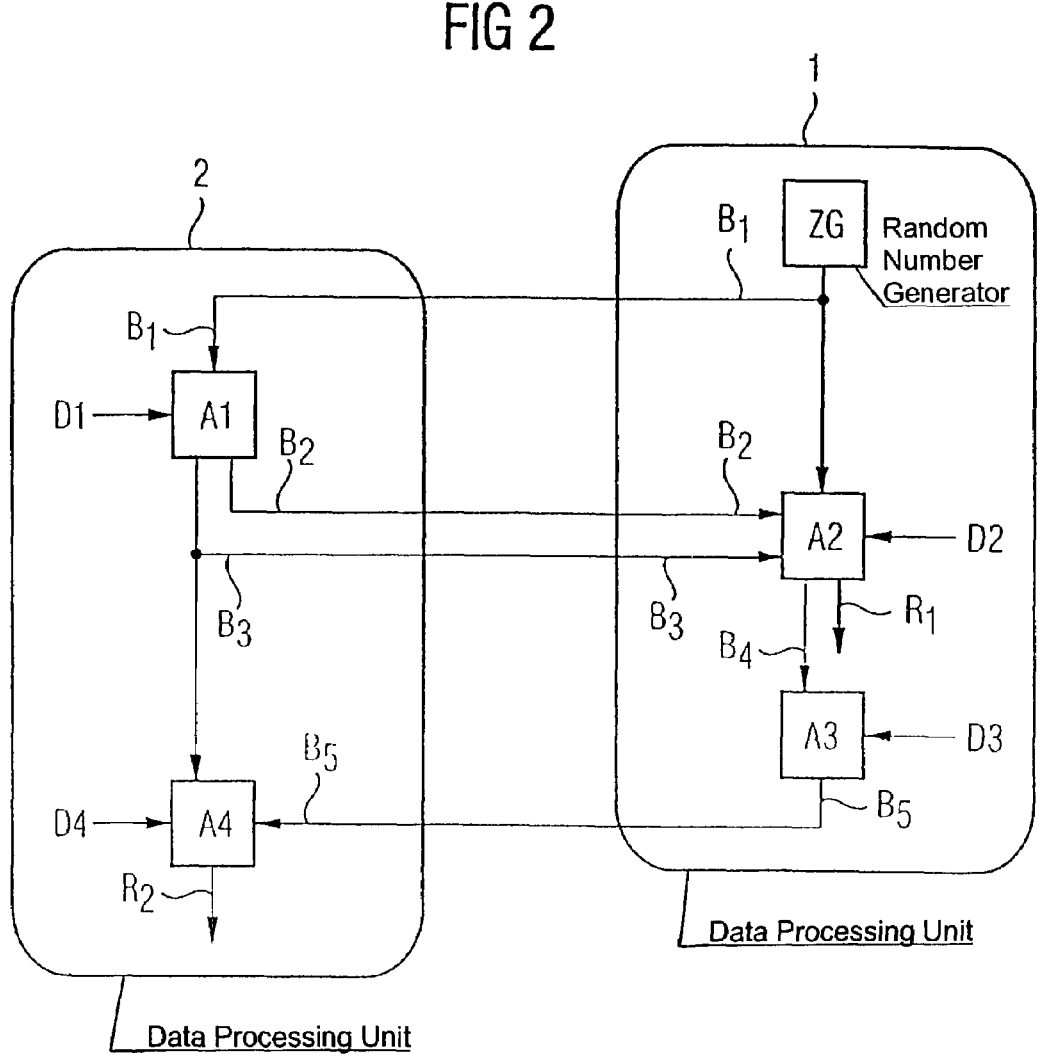
FIG. 2 is a block diagram of second method according to the invention for mutual authentication of two data processing units.

FIG. 2 shows a further method according to the invention for mutual authentication of two data processing units 1, 2. The authentication method which is illustrated in FIG. 2 differs from the authentication method as illustrated in FIG. 1 in that the third bit string B3 is transmitted from the second data processing unit 2 to the first data processing unit 1. A further difference from FIG. 1 is that the third bit string B3 is used in the second algorithm A2, in order to produce the fourth bit string and/or the first authentication result R1. The other method steps are carried out as described in conjunction with FIG. 1.

We claim:

1. A method for mutual authentication of a first data processing unit and of a second data processing unit, based on the challenge and response method, which comprises the steps of:

producing a first bit string in the first data processing unit;

transmitting the first bit string to the second data processing unit;

producing a second bit string and a third bit string from the first bit string and from first data using a first algorithm in the second data processing unit;

transmitting the second bit string to the first data processing unit;

producing a first authentication result and a fourth bit string from the first bit string, from the second bit string and from second data using a second algorithm in the first data processing unit;

producing a fifth bit string from the fourth bit string and from third data using a third algorithm in the first data processing unit;

transmitting the fifth bit string to the second data processing unit; and producing a second authentication result from the third bit string, from the fifth bit string and from fourth data using a fourth algorithm in the second data processing unit.

2. The method according to claim 1, which comprises transmitting the third bit string from the second data processing unit to the first data processing unit and the third bit string is used by the second algorithm to produce at least one of the first authentication result and the fourth bit string.

3. The method according to claim 1, which comprises forming the third bit string from an intermediate result in a calculation of the second bit string.

4. The method according to claim 1, which comprises producing the first bit string randomly.

5. The method according to claim 1, which comprises selecting the first bit string such that it differs from all previously used first bit strings.

6. A configuration for carrying out mutual authentication, based on the challenge and response method, comprising:

a first data processing unit;

a second data processing unit;

a bit string generator disposed in said first data processing unit and producing a first bit string;

a first bit string processing unit for producing a second bit string and a third bit string from the first bit string and from first data, said first bit string processing unit disposed in said second data processing unit;

a second bit string processing unit for producing a first authentication result and a fourth bit string from the first bit string, from the second bit string and from second data, said second bit string processing unit disposed in said first data processing unit;

a third bit string processing unit disposed in said first data processing unit and producing a fifth bit string; and a fourth bit string processing unit for producing a second authentication result from the third bit string, from the fifth bit string and from fourth data, said fourth bit string processing unit disposed in said second data processing unit.

7. The configuration according to claim 6, wherein at least one of said first and second data processing units is an integrated circuit.

8. The configuration according to claim 6, wherein one of said first and second data processing units has at least one XOR gate and a shift register feeding back to said at least one XOR gate.

9. The configuration according to claim 6, wherein one of said first and second data processing units is a smart card, and the other of said first and second data processing units is a smart card terminal.

* * * * *